United States Patent [19]

Sakai et al.

[11] Patent Number: 4,719,692
[45] Date of Patent: Jan. 19, 1988

[54] METHOD OF MANUFACTURING A MAGNETIC HEAD ASSEMBLY

[75] Inventors: Satoshi Sakai, Furukawa; Yuichi Hishi, Miyagi, both of Japan

[73] Assignee: Alps Electric Co., Ltd., Japan

[21] Appl. No.: 807,369

[22] Filed: Dec. 10, 1985

[30] Foreign Application Priority Data

Dec. 10, 1984 [JP] Japan ................. 59-260382

[51] Int. Cl.$^4$ ............................................. G11B 5/42
[52] U.S. Cl. .......................................... 29/603; 360/76; 360/104
[58] Field of Search ............. 29/603; 360/76, 104–109

[56] References Cited

U.S. PATENT DOCUMENTS

| 4,097,908 | 6/1978 | Chou et al. | 360/76 |
| 4,151,573 | 4/1979 | Tandon et al. | 360/104 |
| 4,309,732 | 1/1982 | Kronfeld et al. | 360/104 |
| 4,323,938 | 4/1982 | Thompson | 360/105 |

OTHER PUBLICATIONS

IBM Technical Disclosure Bulletin; vol. 17, No. 12; Daly et al; pp. 3703-3705.

*Primary Examiner*—Carl E. Hall
*Attorney, Agent, or Firm*—Guy W. Shoup

[57] ABSTRACT

A method of manufacturing a magnetic head assembly including a carriage, a lower magnetic head fixed to the carriage, a spring-loaded arm connected to the carriage, and an upper magnetic head fixed to the arm and facing the lower head, the upper and lower heads defining therebetween a clearance having a width which is equal to the thickness of a magnetic disk, the arm is so supported at its end remote from the upper head that it may be rotatable only in a direction which allows the upper head to face the lower head.

4 Claims, 5 Drawing Figures

METHOD OF MANUFACTURING A MAGNETIC HEAD ASSEMBLY

BACKGROUND OF THE INVENTION

1. Field of the Invention

This invention relates to a magnetic head assembly for a magnetic disk recording and playback apparatus.

2. Description of the Prior Art

There is known a magnetic head assembly for reading and writing information on both sides of a magnetic disk, as disclosed, for example, in U.S. Pat. No. 4,151,573. Its general construction is shown in FIG. 4. It comprises a carriage 1, a lower magnetic head 2 secured to the carriage 1, an upper magnetic head 4 located on the opposite side of a magnetic disk 9 from the lower head 2 and mounted rotatably by a gimbal spring 3 on a spring-loaded arm 5 hinged to the carriage 1 by a leaf spring 6 and having a pivot 7 on which the upper head 4 is rotatable, and a compression spring 8 exerting on the arm 5 a force which is transmitted by the pivot 7 to the upper head 4 to urge the magnetic disk 9 against the lower head 2.

The gimbal spring 3 is provided to compensate for the deflection of the magnetic disk 9, and effectively causes the upper head 4 to fit the disk 9. It is, however, likely that the lower head 2 may be separated from the disk 9 instantaneously, as shown in FIG. 5, resulting in the failure to read or write information on the disk 9. A solution to this problem is proposed in, for example, Japanese Laid-Open Patent Specification No. 167164/1982.

The gimbal spring 3 may, however, undergo the three-dimensional or corrugating deformation which allows the displacement of the upper head 4 in the direction of travel of the disk 9. This results in the generation of a frictional noise due to a stick-slip phenomenon. A number of solutions to this problem have been proposed in, for example, Japanese Laid-Open Patent Specification No. 105358/1981 and Japanese Laid-Open Utility Model Specification No. 144660/1983. None of them has, however, been found satisfactory.

It has been found that the two problems as hereinabove pointed out can be solved if the upper head 4 is fixed to the arm 5, while the lower head 2 is fixed to the carriage 1. Still another problem, however, remains unsolved. Insofar as the leaf spring 6 permits the vertical displacement of the arm 5 at its rear end as shown by a broken line in FIG. 4, it is impossible to avoid the concentration of the force of the compression spring 8 on a limited portion of the disk 9 between the lower head 2 and the upper head 4, and hence the localized wear of the disk 9. A solution to this problem is proposed in, for example, U.S. Pat. No. 4,323,938. It, however, fails to avoid the erroneous mounting of the upper magnetic head and the localized wear of the disk, though it may effectively restrict the vertical displacement of the arm at its rear end. Moreover, it is well known to anybody of ordinary skill in the art that the spherical heads as disclosed by U.S. Pat. No. 4,323,938 fail to cope with the current trend toward a magnetic disk having a narrower track.

SUMMARY OF THE INVENTION

It is an object of this invention to overcome the drawbacks of the prior art as hereinabove pointed out and provide an improved magnetic head assembly which ensures the stabilized reading and writing operation of a magnetic disk recording and playback apparatus, and which is easy to manufacture.

This object is attained by a magnetic head assembly which is manufactured by a method comprising fixing a lower magnetic head to a carriage, mounting an upper magnetic head on an arm rotatably by a gimbal spring, connecting the base end of the arm to the carriage rotatably only in a direction which allows the upper head to face the lower head, and fixing the upper head to the arm, while maintaining between the upper and lower heads a clearance having a width which is equal to the thickness of a magnetic disk.

Insofar as the upper head is fixed to the arm, it is always capable of urging the magnetic disk against the lower head with a uniformly distributed force. The magnetic head assembly of this invention is free from the troubles which the gimbal spring has hitherto caused. There is no undesirable separation of the upper or lower head from the magnetic disk, nor does any stick-slip phenomenon arise. Insofar as a uniform distribution of force is maintained between the upper and lower heads, there is no undue wear of the disk. According to this invention, therefore, it is easy to manufacture a magnetic head assembly which ensures the reliable reading and writing operation of a magnetic disk recording and playback apparatus.

DETAILED DESCRIPTION OF THE INVENTION

Figure 1:
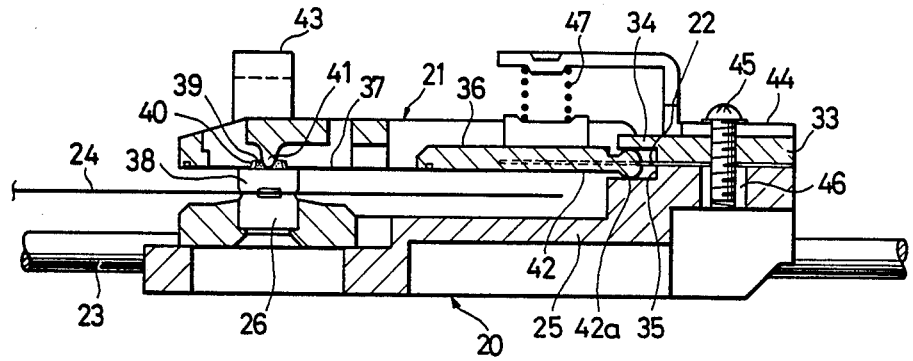
FIG. 1 is a side elevational view, partly in section, of a magnetic head assembly embodying this invention.
Figure 2:
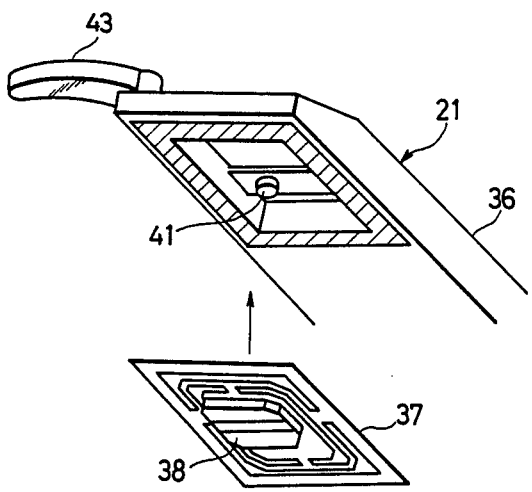
FIG. 2 is a fragmentary enlarged and exploded perspective view showing an upper magnetic head and its vicinity.
Figure 3:
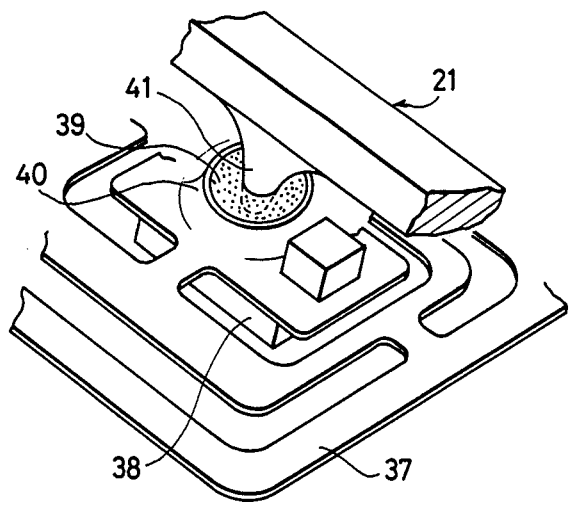
FIG. 3 is another fragmentary enlarged perspective view of the magnetic head assembly shown in FIG. 1.
Figure 4:
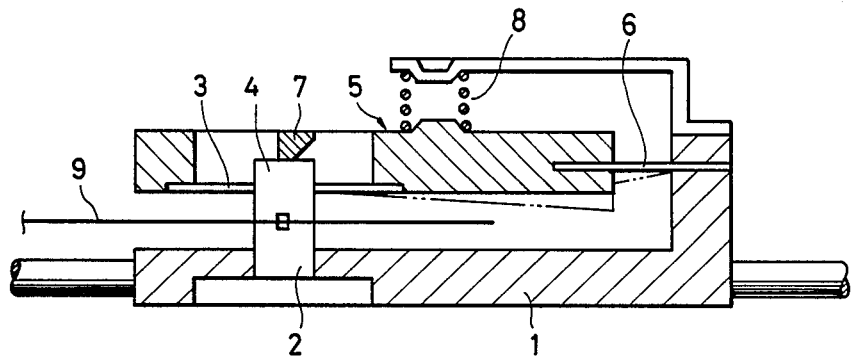
FIG. 4 is a side elevational view, partly in section, of a conventionally known magnetic head assembly.
Figure 5:
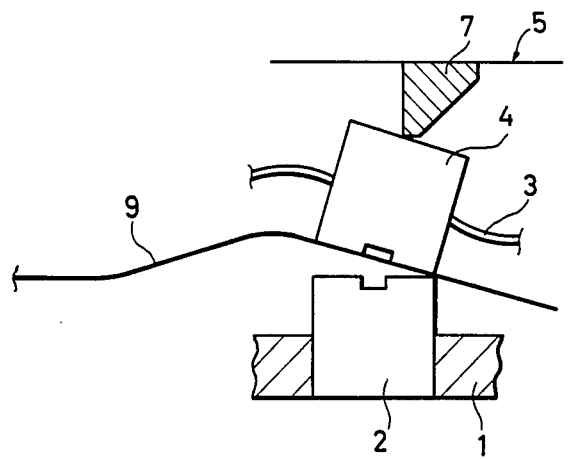
FIG. 5 is a fragmentary enlarged view of the device shown in FIG. 4, explaining one of its drawbacks.

A magnetic head assembly embodying this invention is shown in FIG. 1. It includes a carriage 20 and an arm 21 connected rotatably thereto by a leaf spring 22. It is movable by a pulse motor not shown radially of a magnetic disk 24 along a guide shaft 23. The carriage 20 comprises a carriage member 25 formed from an electrically insulating synthetic resin. It has a front end on which a lower magnetic head 26 is mounted. A spacer 33 is provided above the rear end of the carriage member 25 and has a pair of spaced apart projections 34 extending forward from its front edge. The carriage member 25 and the projections 34 define a reces 35 therebetween.

The arm 21 comprises an arm member 36 formed from an electrically insulating synthetic resin. A gimbal spring 37 comprises a spring metal sheet attached to the front end of the arm member 36. An upper magnetic head 38 is supported by the gimbal spring 37 and fixed to the arm 21 by an adhesive 39. A wall 40 for holding the adhesive 39 forms an integral part of the gimbal spring 37. A pivot 41 projects from the arm member 36 and contacts the gimbal spring 37 or the upper magnetic head 38. The arm member 36 is formed at its rear end with a pair of substantially cylindrical transversely spaced apart projections 42 extending into the recess 35 of the carriage 20. Each projection 42 has a spherically enlarged end 42a located in the recess 35. The enlarged end 42a of each projection 42 rests on the upper surface of the carriage member 25 and is slightly spaced apart from the lower surface of one of the spacer projections 34. A lug 43 is provided adjacent to the front end of the arm member 36 for lifting the arm 21.

The leaf spring 22, which is formed from a single metal sheet, has one end embedded centrally in the rear end of the arm member 36, while the other end thereof is secured to the carriage 20 by a screw 45 extending through a bracket 44 and held by a nut member 46. A compression spring 47 is connected between the arm member 36 and the bracket 44 and urges the arm 21 toward the carriage 20.

The magnetic head assembly constructed as hereinabove described is mounted in a magnetic disk apparatus designed for adjusting the position and azimuth of the upper head 38 before the adhesive 39 is applied to fix it. As regards the azimuth and position of the lower head 26, it is necessary to adjust them when mounting it to the carriage member 25. The adjustment of the upper head 38 is effected by loosening the screw 45 and moving the arm 21, while reading signals recorded on an adjusting magnetic disk (see, for example, U.S. Pat. No. 4,097,908). If the adjustment is finished, the screw 45 is tightened and the magnetic head assembly is removed from the adjusting apparatus. A sheet of paper which is equal in thickness to the magnetic disk 24 is inserted between the upper and lower heads 38 and 26 and the adhesive 39 is put into the space between the wall 40 and the pivot 41 to fix the upper head 38 to the arm 21. In this connection, it is preferable to use paper from which no fiber becomes separated, and an adhesive which comprises, for example, an epoxy resin. When the upper head 38 has been fixed to the arm 21, the gimbal spring 37 is no longer required, but may be removed from the arm 21.

If the arm 21 is moved for adjusting the position and azimuth of the upper head 38, it may be inclined at a variety of very small angles, but the gimbal spring 37, by which the upper head 38 is rotatably mounted on the arm member 36, ensures a uniform distribution of pressure between the upper and lower heads 38 and 26. The spherically enlarged ends 42a about which the arm 21 is rotatable rest smoothly rotatably on the carriage 20 in a mutually spaced apart relationship transversely of the leaf spring 22. The horizontal position of the arm 21 is maintained by the leaf spring 22. Therefore, the arm 21 is rotatable only in the direction which allows the upper head 38 to face the lower head 26, and makes it possible to obtain semipermanently the uniform distribution of pressure between the heads 26 and 38, even if the gimbal spring 37 may be removed.

Other means can be used for connecting the arm 21 to the carriage 20 rotatably only in one direction. For example, it is possible to employ any of the arrangements shown in U.S. Pat. No. 4,323,938, and Japanese Laid-Open Patent Specifications Nos. 122674/1983, 196657/1983 and 107450/1984. Although none of these specifications mentions anything about the mode of mounting the upper head, all of the corresponding commercially available products employ gimbal springs for that purpose.

What is claimed is:

1. A method of manufacturing a magnetic head assembly comprising:
   fixing a lower magnetic head to a carriage;
   mounting an upper magnetic head rotatably by a gimbal spring on an arm having a rear end remote from said upper head which is so positioned as to face said lower head;
   connecting said rear end of said arm to said carriage so that said arm may be rotatable only in a direction which allows said upper head to face said lower head;
   maintaining between said upper and lower heads a clearance having a width which is equal to the thickness of a magnetic disk; and
   fixing said upper head to said arm.

2. A method as set forth in claim 1, further including adjusting the azimuth and position of said upper head before fixing it to said arm.

3. A method as set forth in claim 2, further including removing said gimbal spring from said arm after fixing said upper head to said arm.

4. A method as set forth in claim 1, wherein said upper head is fixed to said arm by a adhesive.

* * * * *